United States Patent
Peake, III et al.

(10) Patent No.: US 11,803,994 B2
(45) Date of Patent: Oct. 31, 2023

(54) SYSTEMS AND METHODS FOR ENCODING AND RENDERING ANIMATION USING A POINT CLOUD

(71) Applicant: Illuscio, Inc., Culver City, CA (US)

(72) Inventors: William Peake, III, Los Angeles, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 60 days.

(21) Appl. No.: 17/727,327

(22) Filed: Apr. 22, 2022

(65) Prior Publication Data

US 2023/0281900 A1     Sep. 7, 2023

Related U.S. Application Data

(60) Provisional application No. 63/316,315, filed on Mar. 3, 2022.

(51) Int. Cl.
    *G06T 13/20*      (2011.01)
    *G06T 3/40*      (2006.01)
    *G06T 11/00*      (2006.01)

(52) U.S. Cl.
    CPC ............. *G06T 13/20* (2013.01); *G06T 3/40* (2013.01); *G06T 11/001* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 11,113,875 B1* | 9/2021 | Monaghan | ............ G06T 11/206 |
| 2020/0217937 A1* | 7/2020 | Mammou | ............... G06T 9/004 |

OTHER PUBLICATIONS

G. Paravati, F. Lamberti, V. Gatteschi, C. Demartini and P. Montuschi, "Point Cloud-Based Automatic Assessment of 3D Computer Animation Courseworks," Oct. 1-Dec. 2017, in IEEE Transactions on Learning Technologies, vol. 10, No. 4, pp. 532-543, doi: 10.1109/TLT.2016.2638811. (Year: 2017).*

* cited by examiner

*Primary Examiner* — Peter Hoang
(74) *Attorney, Agent, or Firm* — Ansari Katiraei LLP; Arman Katiraei; Sadiq Ansari

(57) ABSTRACT

Disclosed is a system for encoding and/or rendering animations without temporal or spatial restrictions. The system may encode an animation as a point cloud with first data points having a first time value and different positional and non-positional values, and second data points having a second time value and different positional and non-positional values. Rendering the animation may include generating and presenting a first image for the first time value of the animation based on the positional and non-positional values of the first data points, and generating and presenting a second image for the second time value of the animation by changing a visualization at a first position in the first image based on the positional values of a data point from the second data points corresponding to the first position and the data point non-positional values differing from the visualization.

20 Claims, 9 Drawing Sheets

SYSTEMS AND METHODS FOR ENCODING AND RENDERING ANIMATION USING A POINT CLOUD

CLAIM OF BENEFIT TO RELATED APPLICATIONS

This application claims the benefit of United States provisional application 63/316,315, entitled "Systems and Methods for Encoding and Rendering Animation Using a Point Cloud", filed Mar. 3, 2022.

BACKGROUND

Animation and/or video encoding and rendering techniques may use fixed spatial and temporal dimensions to produce an animation and/or video that has a fixed number of frames per second with each frame presenting an image at a fixed resolution that may be the same or different than a previous image. Compression techniques may be used to reduce the size of the animation and/or video file by encoding some frames as key frames and other frames as reference frames. A key frame may contain the data that is needed to present an image without referencing data from other frames, whereas a reference frame may reference an earlier or later frame in the animation and may contain the subset of data that has changed from the earlier or later referenced frame.

Nevertheless, fixing the spatial and temporal dimensions when encoding and/or rendering an animation or video may introduce duplicative data and processing overhead. This may be especially problematic when encoding and/or rendering high-resolution animations, animations with different variability throughout, and/or animations with images having different levels of detail as large file sizes and processing of larges amounts of data at the fixed rate may result in an interrupted animation.

DETAILED DESCRIPTION OF PREFERRED EMBODIMENTS

Figure 1:
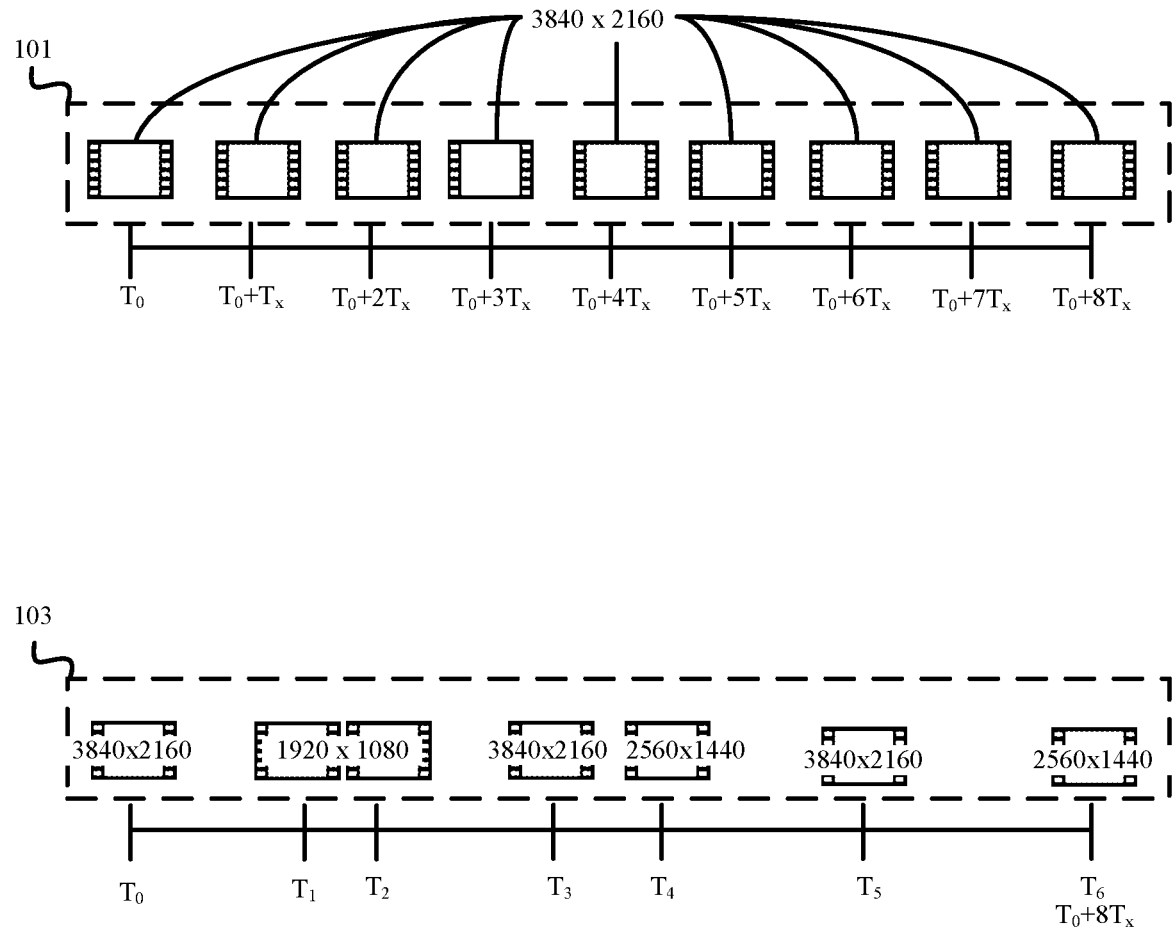
FIG. 1 illustrates an example of an animation and/or video that is encoded with spatial and temporal restrictions, and the same animation and/or video encoded without the spatial and temporal restrictions in accordance with some embodiments presented herein.

The following detailed description refers to the accompanying drawings. The same reference numbers in different drawings may identify the same or similar elements.

Provided are systems and methods for generating an animation and/or video that is not spatially or temporally restricted in the same manner as animations that are encoded at a fixed resolution and fixed rate (e.g., fixed number of frames per second for the duration of the animation). The systems and methods may include defining an animation and/or video format for storing a animation without spatial or temporal restrictions, providing an encoder for encoding an animation without the spatial or temporal restrictions, and/or providing a renderer for generating a visualization from an animation encoded without the spatial or temporal restrictions.

In some embodiments, a point cloud may be adapted for the animation and/or video format. In some such embodiments, the encoder of an encoding and rendering system may efficiently record, store, and/or encode an animation without spatial or temporal restrictions as different data points within the same point cloud, and/or the renderer of the encoding and rendering system may efficiently generate images for the animation without spatial or temporal restrictions based on the point cloud data points. By removing the spatial restrictions from an animation, each image of the spatially unrestricted animation may have the same or different resolution as another image of the same spatially unrestricted animation. In other words, the spatially unrestricted animation is no longer restricted to a single resolution, and the encoder may encode low-detail scenes of the animation at a lower resolution using fewer data points than high-detail scenes. By removing the temporal restrictions from an animation, each image from the temporally unrestricted animation may be rendered and/or presented at different times than other images of the same temporally unrestricted animation. For instance, if the temporally unrestricted animation does not change for one second, then the temporally unrestricted animation may include a single image for that entire time. If the temporally unrestricted animation changes frequently over a next second, then the temporally unrestricted animation may include multiple images to record and present each of the changes.

The removal of the spatial and temporal restrictions may further allow for a continuously encoded and/or rendered animation. For instance, the encoder may define discrete point cloud data points for where and when each detected change in an animation occurs, instead of defining data for an entire image or frame where or when a change occurs or even when no change occurs in the animation. Similarly, rendering the animation may include rendering a first image based on a first set of point cloud data points that are defined for the start time, and changing different data points within the first image at different times based on point cloud data points that are defined at those different times and at specific positions of the first image while leaving the other previously rendered data points of the first image unchanged.

The point cloud, that results from encoding an animation without spatial or temporal restrictions, may provide a format that efficiently stores the animation without loss of detail and with a reduced file size for high-resolution animations, animations with infrequent variations, animations with varying levels of detail, and/or other animations relative to existing encoding techniques that generate a fixed number of frames at a fixed rate for the entirety of the animation. Moreover, the point cloud may reduce processing overhead required to render and/or present high-resolution animations by processing the changes to the animation as those changes occur rather than process and render much if not all of same frame over and over again at a fixed rate when there are no changes or few changes to the animation.

In some embodiments, different animations may be generated from the point cloud based on data that is already present within the point cloud. The point cloud may include data points (e.g., thousands, millions, billions, etc.) in three-dimensional space ("3D") that correspond to imaged points of a 3D object or environment. The encoder may encode the entirety of the 3D object or environment and any and all movements, changes, and/or animations occurring therein over a period of time. The renderer may selectively render animations at different parts of the 3D object or environment by rendering a subset of data points at the corresponding positions within the point cloud, or by changing the movement of a rendering position within the point cloud to change the subset of data points that are rendered at different times of the animation.

FIG. 1 illustrates an example of an animation and/or video that is encoded with spatial and temporal restrictions, and the same animation and/or video encoded without the spatial and temporal restrictions in accordance with some embodiments presented herein. As shown in FIG. 1, spatially and temporally restricted animation 101 may encode a new image or frame at a fixed repeating rate with each new image or frame having the same resolution. For instance, spatially and temporally restricted animation 101 may represent part of a one-minute video that is encoded at a 3840×2160 resolution with 30 frames per second ("fps"). Spatially and temporally unrestricted animation 103 may encode a new image at different times based on the amount of change occurring within the animation 103. Moreover, different sets of images from spatially and temporally unrestricted animation 103 may be encoded at different resolutions to present different scenes and/or changes with different levels of detail.

FIG. 1 further illustrates an example of the encoding efficiencies that may result from encoding animations without the spatial and temporal restrictions. For instance, spatially and temporally restricted animation 101 may encode a particular duration of the animation as 9 distinct frames or images, whereas spatially and temporally unrestricted animation 103 may encode the same particular duration of the animation as 7 distinct images that span the same particular duration as the 9 distinct frames or images of spatially and temporally restricted animation 101, but that are rendered at irregular intervals and with different resolutions based on the amount of change and level of detail detected within the particular duration of the animation. For instance, the time between rendering the first image and the second image of animation 103 may be greater than the time between rendering the third image and the second image of animation 103. Stated differently, the encoder may encode the second image with a first time gap from the first image, and may encode the third image with a different second time gap from the second image as a result of less change occurring in the animation or the change occurring at a later time between the first image and the second image than between the second image and the third image.

In some embodiments, the point cloud and the individual data points of the point cloud that represent a 3D object or environment may be generated by a 3D or depth-sensing camera, Light Detection and Ranging ("LiDAR") sensor, Magnetic Resonance Imaging ("MRP") device, Positron Emission Tomography ("PET") scanning device, Computerized Tomography ("CT") scanning device, time-of-flight device, and/or other imaging equipment for 3D objects, volumetric objects, or 3D environments. The point cloud may be generated from output of two or more devices. For instance, a first imaging device (e.g., a LiDAR sensor) may determine the position for each data point in 3D space, and a second imaging device (e.g., a high-resolution camera) may measure or capture the visual characteristics or other non-positional information for each data point.

In some embodiments, the point cloud and the individual data points of that point cloud may be computer generated, and may correspond to a digitally created 3D object or environment. In some embodiments, the point cloud may include a combination of imaged real-world objects or environments and digitally created objects or environments.

The point cloud data points may differ from pixels of a two-dimensional ("2D") image, because certain regions of the point cloud may have no data points, lower densities of data points, and/or higher densities of data points based on varying amounts of information that are detected at those regions when imaging a 3D object, volumetric object, or 3D environment. For instance, a point cloud imaging device may capture an object closer to the point cloud imaging device with more data points (e.g., a higher resolution) than if the same object was placed further away from the point cloud imaging device because a greater number of emitted beams (e.g., light, laser, etc.) from the device make contact with the closer object than the farther object and with measurements from each beam resulting in a different data point of point cloud. In contrast, pixels of a 2D image have a uniform density and a fixed arrangement defined by the resolution of the 2D image. Moreover, the point cloud data points may have a non-uniform placement or positioning in 3D space, whereas the 2D image has pixel data for each pixel of a defined resolution (e.g., 640×480, 800×600, etc.).

Each point cloud data point may include positional and non-positional values. The positional values may include coordinates within 3D space. For instance, each point cloud data point may include x-coordinate, y-coordinate, and z-coordinate values for each imaged point, feature, surface, or element of the 3D object or environment. The non-positional values of a data point may include values for descriptive properties of that data point. The descriptive properties of a data point may define one or more characteristics of a point, element, feature, or surface from the 3D object or environment that is captured or represented by that data point.

In some embodiments, the descriptive properties may include the visual characteristics of the represented point, element, feature, or surface. The visual characteristics may correspond to a detected color. The color may be represented using red, green, blue ("RGB"), and/or other color values. In some embodiments, the descriptive properties may include the chrominance and/or luminance of the imaged point, element, feature, or surface.

In some embodiments, the descriptive properties may include properties of the imaging device used to capture the 3D environment. For instance, the descriptive properties may include a Tesla strength value to quantify the strength of the magnetic field that was used in detecting and/or imaging a particular point of the 3D environment. In some embodiments, the descriptive characteristics may include energy, sound, and/or other characteristics of the imaging device or the object being imaged.

In some embodiments, the descriptive properties may include material properties of the imaged point, element, feature, or surface. The material properties may be used to calculate the physics that result when an object makes contact with the imaged point, element, feature, or surface. The material properties may specify the magnetism, strength, softness or hardness, viscosity, stickiness, and/or weight for the imaged point, element, feature, or surface. Accordingly, the non-positional values may include any property or descriptive characteristic of the imaged object part (e.g., hue, saturation, brightness, reflectivity, etc.) or of the imaging device used to capture the object part at a corresponding data point in 3D space.

The positional and non-positional values for each particular data point may be stored in an array, and may be associated with that particular data point using an identifier or one or more of the positional and/or non-positional values. For instance, a particular data point may be identified with its x-coordinate, y-coordinate, and z-coordinate values, and the non-positional values, such as the red, green, blue, chrominance, luminance, tesla, and/or other values, for that particular data point may be accessed via a lookup of the x-coordinate, y-coordinate, and z-coordinate values.

The encoder may encode a spatially and temporally unrestricted animation and/or video within the data points of the point cloud. In particular, the encoder may encode a time value as a new non-positional value for each data point.

The time value may specify a time and/or duration at which the data point becomes active, is visualized within the animation, and/or is to be rendered. The introduction of the time value may result in point cloud having two or more instances of a data point with the same positional values (e.g., x, y, z coordinates), and with each instance having a different time value and different non-positional values.

The renderer may selectively render the point cloud data points based on their time values. Specifically, the renderer may selectively render the point cloud data points that have time values corresponding to the currently playback time or position of the animation being presented. For instance, the renderer may render and/or present a data point with a first time value at a corresponding first time of an animation and/or video, may remove that data point from the rendered presentation at a second time of the animation and/or video that is after the duration associated with the first time value, and may render a second instance of the data point at the same position and at a third time of the animation and/or video based on the data point being associated with a second time value that corresponds to the third time of the animation and/or video. Moreover, the renderer may change the appearance or presentation of the data point at the first time and the third time based on different non-positional values that are associated with each instance of the data point.

In some embodiments, the time value may be used to identify when a data points becomes inactive or should be removed from the animation or rendered images. For instance, the renderer may render a data point at a particular position and a first time in the animation based on a positional and non-positional values of the data point and a first time value that corresponds to the first time. The renderer may continue to present the visualization created for that data point until a second time as a result of a data point being defined in the point cloud with the same positional values, a second time value that corresponds to the second time, and zero or negative non-positional values.

Figure 2:
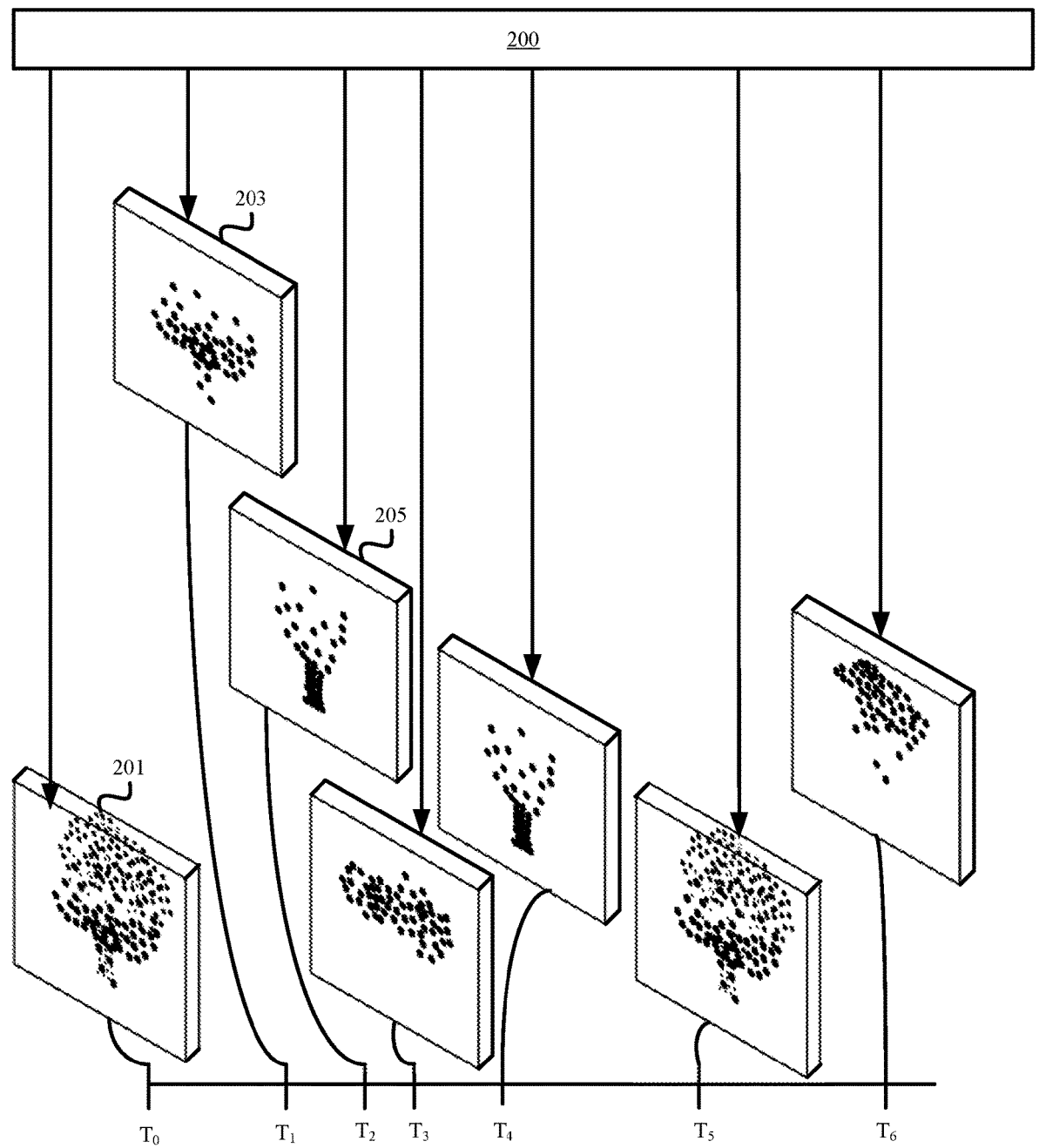
FIG. 2 illustrates an example of a point cloud encoding an animation without spatial and temporal restrictions in accordance with some embodiments presented herein.

FIG. 2 illustrates an example of a point cloud encoding an animation without spatial and temporal restrictions in accordance with some embodiments presented herein. As shown in FIG. 2, encoding and rendering system 200 may encode the point cloud with a first set of data points 201 that include a first time value, and may present each data point of the first set of data points 201 at the first time of the animation and/or video. Presenting the first set of data points 201 may include rendering each data point of the first set of data points 201 according to their non-positional values at a position defined by their respective positional value.

Encoding and rendering system 200 may present the first set of data points 201 for a first duration. The first duration may span several milliseconds, seconds, or another time duration. The image produced for the image animation and/or video during the first duration may remain constant. The lack of change during the first duration may be identified within the point cloud as a result of no point cloud data points having a time value within the first duration.

Encoding and rendering system 200 may encode the point cloud with a second set of data points 203 that include a second time value. The second time value may be defined as a time that is the first duration after the first time value. The encoder may define the second set of data points 203 with the second time value to record a change to the animation and/or video (e.g., the first image) that occurs at the second time value, and to generate a second image by modifying one or more of the first set of data points 201 that are rendered as part of the first image.

The second set of data points 203 may include more or fewer data points than the first set of data points 201 as the point cloud encoding is not spatially restricted. In some embodiments, the second set of data points 203 may encode discrete changes in the first image that was created from the first set of data points 201 without having to define each and every data point of the second image, data points of the first image that remain unchanged, and/or parts of the second image that have no visual data and/or are not defined by any data points. In other words, the second set of data points 203 need not include data points for every part of the second image, but a subset of data points for the positions in the first image where there is change and non-positional values to render the change. Additionally, the second set of data points specify positional values that may overwrite exact locations or positions within the first image without having to reference or link to reference any data from the first image or the first set of data points 201.

In some embodiments, the second set of data points 203 may change the animation resolution. For instance, rendering the first set of data points 201 may generate the first image with a first resolution (e.g., 1920×1080), and rendering the second set of data points 203 may add data points that change the visualization of the first image and that increase the detail of the second image to a second resolution (e.g., 3840×2160).

At the second time, encoding and rendering system 200 may change part of the rendered animation and/or video by presenting each data point of the second set of data points 203 at positions defined by the positional values of the second set of data points 203 and with visual characteristics defined by the non-positional values of the second set of data points 203. In some embodiments, the second set of data points 203 may change one or more of the previously rendered first set of data points 201 and/or may add additional data points to the first image created from the rendering of the first set of data points 201. In some embodiments, one or more data points of the first set of data points 201 may also be removed from the rendered image. For instance, the time value for one or more of the first set of data points 201 may include a duration value that specifies how long after the first time value those data points remain as part of the visualization or rendering. Alternatively, the one or more data points of the first set of data points 201 that are to be removed at the second time value may be defined with the same positional values, a time value corresponding to the second time, and non-positional values with negative or zero values to indicate the removal of these data points at the second time. The first set of data points 201 may generate a first image of an animated tree, and the second set of data points 203 may generate a second image of the same animated tree with motion or a change in coloring for some of the leaves in the tree.

In some embodiments, the animation may be controlled by defining different render positions within the point cloud at the different time values. The different render positions may correspond to changing position and/or orientation of a virtual camera in the point cloud at the different time values. The changing position and/or orientation may set a changing field-of-view, and may further limit which sets of data points from the point cloud are to be rendered at each time value. For example, the point cloud may define a first render position at the first time value that encompasses and renders the first set of data points 201, and may define a second render position at the second time value that shifts the rendered field-of-view to encompass some of the previously rendered first set of data points 201 and the second set of data points 203. In this example, the second render position may move a virtual camera around the tree that is rendered at the first time value so that a different part of the tree represented by the second set of data points 203 becomes visible and presented as part of the animation. In some such embodiments, encoding and rendering system 200 may avoid rerendering the subset of the first set of data points 201 at the adjusted positions. Instead, encoding and rendering system 200 may compute a shift that results from moving from the first render position to the second render position in the point cloud, may shift the rendered subset of the first set of data points 201 to appear in the adjusted position of the second image, and may render the second set of data points 203 that fall in the field-of-view at the second time value.

Accordingly, the introduction of different render positions for different time values in the point cloud may alter or restrict which data points are rendered at each time values. Specifically, encoding and rendering system 200 may identify the set of point cloud data points that have a particular time value corresponding to the current time or position in the animation. Encoding and rendering system 200 may determine the rendering field-of-view for the particular time value based on the render position defined for the particular time value, and may filter the set of point cloud data points that have the particular time value to retain and/or render a subset of the set of data points falling within the rendering field-of-view. Encoding and rendering system 200 may retain the visualization created for previously rendered data points and may rotate, shift, and/or otherwise move the visualized data points in relation to the change in the render position, and may render any data points that were not previously rendered and that specify the particular time value.

With reference back to FIG. 2, encoding and rendering system 200 may encode the point cloud with a third set of data points 205 that include a third time value. The third time value may be defined as a time that is a second duration after the second time value. The second duration (e.g., the different between the third time value and the second time value) may be the same, larger, or lesser than the first duration (e.g., the difference between the second time value and the first time value), and may record another change to the animation and/or video (e.g., the second image). For instance, the second time value of the second set of data points 203 may specify a rendering time that is one second after the first time value of the first set of data points 201, and the third time value of the third set of data points 205 may specify a rendering time that is 300 milliseconds after the second time value of the second set of data points 203. In this manner, encoding and rendering system 200 may encode the animation and/or video without temporal restrictions, and may change the animation and/or video at different times and/or rates.

At the third time, encoding and rendering system 200 may change a different part of the rendered animation and/or video by presenting each data point of the third set of data points 205 at positions defined by the positional values of the third set of data points 205 and with visual characteristics defined by the non-positional values of the third set of data points 205. For instance, the third set of data points 205 may generate a third image of the animation and/or video that creates some visual change in the trunk, branches, and/or leaves of the animated tree and/or in the previously rendered first and second images.

As shown in FIG. 2, encoding and rendering system 200 may encode the point cloud with additional sets of data points that have different time values corresponding to times within the animation at which each set of data points is to be rendered and/or presented. The number of data points associated with each time value may differ based on the amount of change, level of detail that is captured for each change in the animation, and/or changes in the animation resolution. Similarly, the amount of time between each adjacent pair of time values may differ depending on when each change in the animation is encoded by encoding and rendering system 200, changes in the render position, the number of changes in the animation, the scope of the changes, and/or other factors used in determining when to define data points with new time values.

Figure 3:
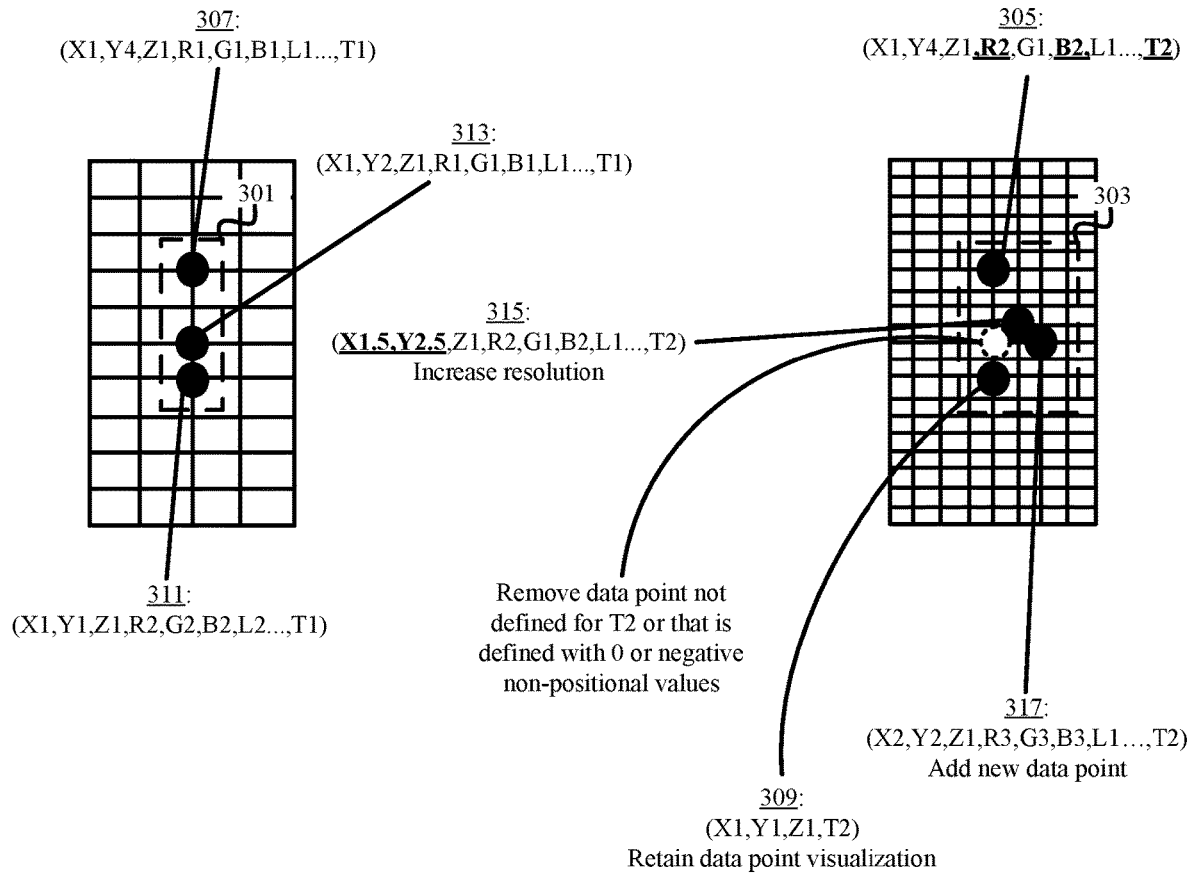
FIG. 3 illustrates an example of data points that are encoded with different time values in a point cloud for a spatially and temporally unrestricted animation in accordance with some embodiments presented herein.

FIG. 3 illustrates an example of data points that are encoded with different time values in a point cloud for a spatially and temporally unrestricted animation in accordance with some embodiments presented herein. Each data point of a first set of three data points 301 may be defined with positional values and non-positional values. The positional values may define a position in 3D space for each data point. The non-positional value may define descriptive characteristics of each data point that may be visualized and/or rendered with some graphical representation on a display at the corresponding position in 3D defined by the positional values of that data point. Additionally, each data point may include a first time value (i.e., T1) as one of the non-positional values.

The first time value may indicate that each data point of the first set of three data points 301 is to be rendered and/or presented at a corresponding first time of the animation and/or for a first duration after the first time. The first time value may be defined as a discrete point in time in the animation. For instance, the first time value correspond to the $20^{th}$ millisecond of the animation. Accordingly, the encoding and rendering system may render and/or present each data point of the first set of three data points 301 once the animation reaches the first time value. In some embodiments, the encoding and rendering system may continue presenting and/or displaying each rendered data point of the first set of three data points 301 on a display or as part of rendered video until the data point is overwritten by another data point that has the same positional values and that has a later time value. In some embodiments, the encoding and rendering system may continue presenting and/or displaying each rendered data point of the first set of three data points 301 until a next time value in the point cloud is reached.

As shown in FIG. 3, the same point cloud, that is defined with the first set of three data points 301, may be defined with a second set of four data points 303. The second set of four data points 303 may be defined with a second time value that comes after the first time value, and may identify changes in the animation and/or image rendered from the set of three data points 301 occurring at a second time in the animation. For instance, data point 305 of the second set of four data points 303 may be defined with the second time value, the same positional values as data point 307 of the first set of three data points 303, and with different non-positional values than data point 307. Accordingly, the encoding and rendering system may adjust the animation at the second time by overwriting the visualization that was created from the positional and non-positional values of data point 307 at the first time with a visualization that is created from the positional and non-positional values of data point 305 at the second time. For instance, data point 307 may be rendered as a blue dot in the animation at the first time value, and the encoding and rendering system may change that blue dot in the animation to a red dot at the second time value based on the non-positional values that are defined for data point 305 at the second time and at the same positional values as data point 307 associated with the blue dot.

Data point 309 of the second set of four data points 303 may be defined with the same positional values as data point 311 of the first set of three data points 303, and with no non-positional values other than the second time value. The absence of non-positional values associated with data point 309 may be interpreted by the encoding and rendering system as an instruction to retain the visualization created at the same positional values from an earlier rendered data point (e.g., data point 311).

Second set of data points 303 may not include any data points that are defined with the same positional values as data point 313 of the first set of three data points 301. Accordingly, the encoding and rendering system may remove the visualization that is created for that point 313 from the animation at the second time. Alternatively, second set of data points 303 may include a data point that is defined with the same positional values as data point 313 and with zero or negative non-positional values, wherein the zero or negative non-positional values associated with a particular time value and particular positional values indicate that the particular time when a previously rendered data point at the positional values is to be removed from the visualization and/or rendering.

Second set of data points 303 may include two data points 315 and 317 that are defined with the second time value and with positional values that are different than the positional values for each data point of the first set of data points 301. Moreover, second set of data points 303 may be defined at a different resolution than first set of data points 301 based on the positional values of data point 315 being defined with greater precision and/or at a smaller scale than the positional values of the first set of data points 301. Accordingly, the encoding and rendering system may introduce visualizations that are generated from the positional and non-positional values of data points 315 and 317 into the animation at the second time value.

To reduce the time and resources associated with encoding and/or rendering an animated point cloud, some embodiments may define the time value with a duration and/or an end time. For instance, the time value for a particular data point may specify the time at which the particular data point is to be rendered and/or presented as part of the animation, and may further specify how long the particular data point visualization is to remain as part of the animation. Accordingly, a data point that remains unchanged for some amount of time throughout an animation and/or video may be defined once in the point cloud rather than being defined for each time value of the animation and/or for each image that is generated for the animation during that same amount of time.

Figure 4:
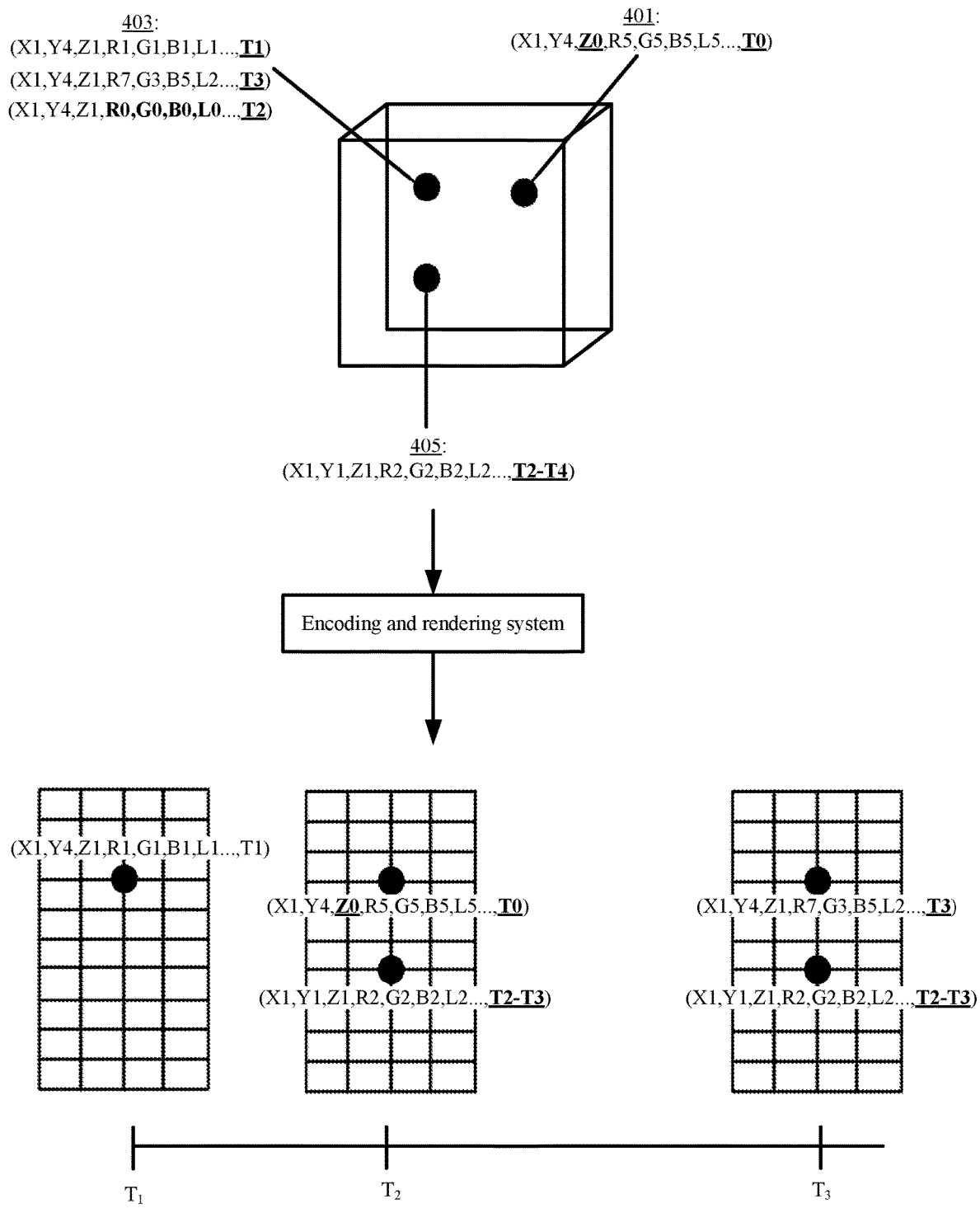
FIG. 4 illustrates an example of rendering animated point cloud data points for different durations based on a definition of each data point in the point cloud in accordance with some embodiments presented herein.

FIG. 4 illustrates an example of rendering animated point cloud data points for different durations based on a definition of each data point in the point cloud in accordance with some embodiments presented herein. FIG. 4 illustrates an example definition for three different data points 401, 403, and 405 from the same point cloud.

Data point 401 may correspond to a static background data point that remains unchanged throughout the duration of the animation. Accordingly, data point 401 may be defined with an infinite time value (e.g., T0) and a background z-coordinate positional value (e.g., Z0) to indicate that data point 401 is to remain visible throughout the duration of the animation unless another data point is rendered in front of data point 401.

Data point 403 may be associated with two different definitions that have different time values and different non-positional values for the color attributes of data point 403 at the different time values. Moreover, the positional values of data point 403 locate data point 403 directly in front of data point 401 (e.g., same x and y-coordinate positional values and a closer z-coordinate value) such that the visualizations created for data point 403 replace the visualization created for data point 401 at the time values defined for data point 403. The visualization created for data point 401 may be presented at other times during the animation when the render position encompasses the position defined for data point 401. Specifically, based on the definitions of data point 401 and data point 403, the encoding and rendering system may generate a first visualization at the common position defined for data points 401 and 403 and at a first time based on the non-positional values from the first definition of data point 403 having the first time value corresponding to the first time, may generate a second visualization at the common position and at a second time based on the non-positional values of data point 401 (and data point 403 not being defined for the second time), and may generate a third visualization at the common position and at a third time based on the non-positional values from the second definition of data point 403 having the third time value corresponding to the third time. In some embodiments, data point 403 may also be defined at the second time with zero or negative non-positional values to expressly indicate that the visualization of data point 403 is to be removed from the image rendered at the second time.

Data point 405 may correspond to a data point that is rendered and/or presented for a specified duration of the animation. The specified duration may be defined in the time value of data point 405. In some embodiments, the time value of data point 405 may be defined with a start time corresponding to the second time and an end time corresponding to a fourth time that is after the third time. In some embodiments, the time value of data point 405 may be defined with the start time and a duration in milliseconds, seconds, and/or another time increment. Accordingly, the encoding and rendering system may not render data point 405 at the first time or until the animation reaches the second time. The encoding and rendering system may determine that the time value of data point 405 starts at the second time, and may therefore generate a visualization in the animation at the second time based on the positional and non-positional values of data point 405, and may retain that visualization until the animation reaches the fourth time. Upon the animation reaching the fourth time, the encoding and rendering system may remove the visualization that is generated for data point 405 from the remainder of the animation.

Figure 5:
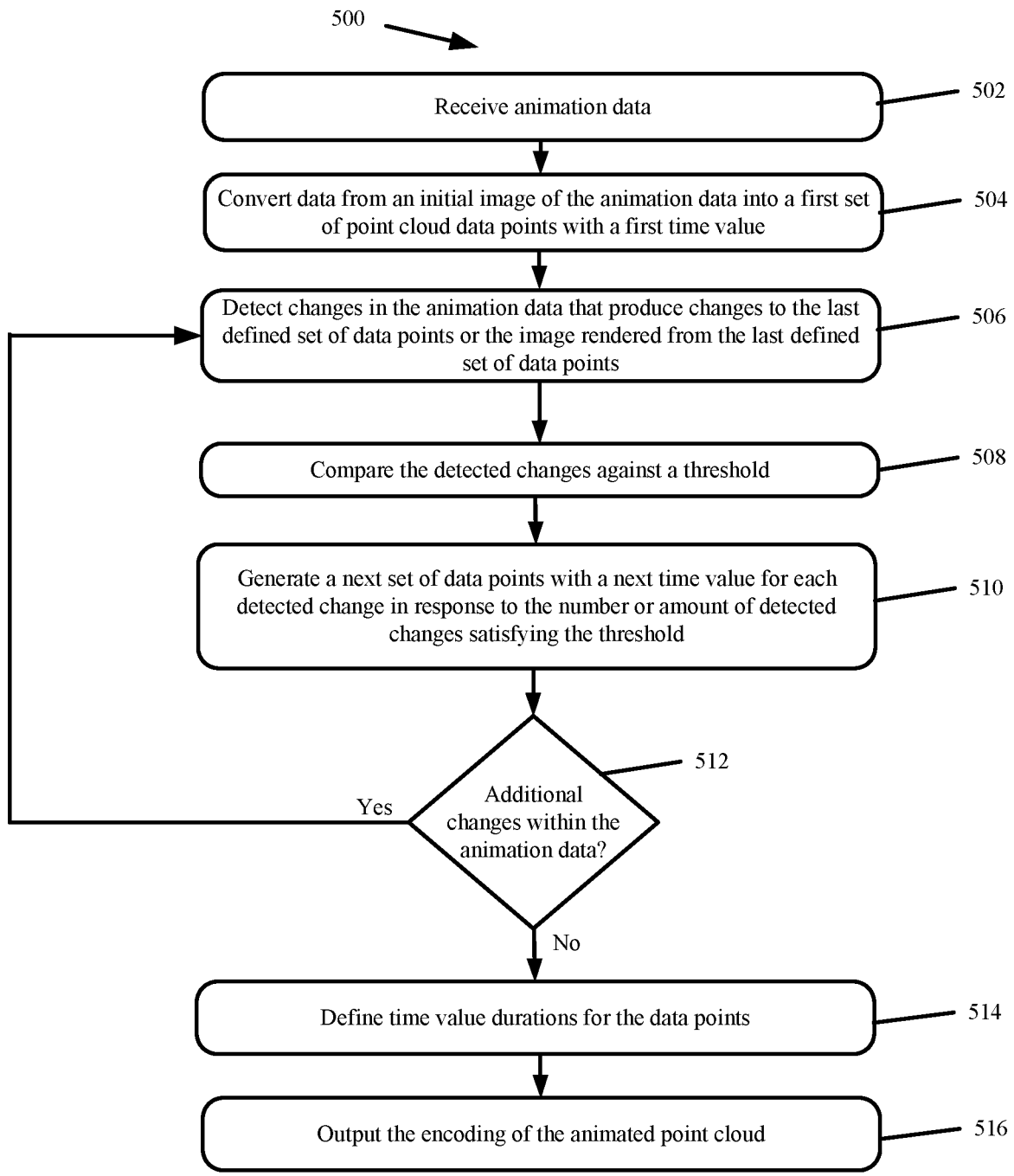
FIG. 5 presents a process for encoding an animation without spatial or temporal restrictions using data points of a point cloud in accordance with some embodiments presented herein.

FIG. 5 presents a process 500 for encoding an animation without spatial or temporal restrictions using data points of a point cloud in accordance with some embodiments presented herein. Process 500 may be implemented by the encoding and rendering system. In some embodiments, the encoding and rendering system may include an encoder that runs on one or more imaging devices used to capture animation from a live scene or environment, or that run separate from the imaging devices.

Process 500 may include receiving (at 502) animation data. The animation data may include a sequence of images (e.g., 2D or 3D images) that is generated by the one or more imaging devices (e.g., cameras, LiDAR, etc.). The animation data may include a file that encodes an animation or video using a traditional encoding format that is temporally and/or spatially restricted. The animation data may include data representing a 3D environment and/or data representing an animation or from which an animation may be created.

Process 500 may include converting (at 504) data from an initial image of the animation data into a first set of point cloud data points with a first time value. The initial image may include a first or starting visualization of the animation. The first time value may correspond to a start time of the animation. The conversion (at 504) may vary depending on the animation data source. For instance, if the animation data is generated by a LiDAR sensor and a camera, then conversion (at 504) may include associating depth and positional information from the LiDAR sensor to color and/or attributes captured by the camera at a corresponding data point of the first set of point cloud data points. If the animation data is generated from a 3D computer-generated environment, then conversion (at 504) may include defining a data point for each corresponding point in the 3D computer-generated environment with the positional values of the data point matching the positioning of the corresponding point in the 3D computer-generated environment and with the non-positional values of the data point matching the coloring and/or other attributes of the corresponding point in the 3D computer-generated environment. If the animation data is generated from a 2D camera or is a 2D image, then conversion (at 504) may include converting each pixel into one or more data points.

Process 500 may include detecting (at 506) changes in the animation data that produce changes in one or more of the positional values or non-positional values of the first set of data points. Detecting (at 506) the changes may include processing the animation data to determine how long each data point of the first set of data points remains constant in the animation data, and/or to track positional and non-positional changes to the first set of data points and times at which those changes occur in the animation data. In some embodiments, the animation changes may occur in response to a changing camera position, motion or changing visual characteristics of different objects within the animation, lighting changes, etc.

Process 500 may include comparing (at 508) the detected (at 506) changes against a threshold. The threshold may specify an amount of change in the animation before data points with different time values are defined as part of the animated point cloud. The threshold may be set differently for different encodings. In some embodiments, the threshold may be set to a detected change in a single data point. In some other embodiments, the threshold may be set to a detected change in a certain percentage of the last image (e.g., the initial image) or the last defined set of data points (e.g., the first set of data points). The threshold is used to remove any fixed temporal restrictions from the encoding, and allows the encoding to proceed based on changes occurring within the animation rather than at some fixed rate.

Process 500 may include generating (at 510) a next set of data points with a next time value for each detected change in response to the number or amount of detected (at 506) changes satisfying the threshold. Each data point from the next set of data points represents a discrete change that is to be visualized in the rendered animation at a time corresponding to the next time value. More specifically, each data point from the next set of data points may be defined with positional values and non-positional values for a detected change at a corresponding location in the animation. The time value specified for the next set of data points may correspond to a time in the animation at which the detected changes satisfied the threshold. For instance, if it took 37 milliseconds from the animation start time for the encoder to detect enough changes in the animation data to satisfy the threshold a first time, then the time value for the next set of data points may be set to the 37 millisecond mark in the animation. If it took another 52 milliseconds from the last defined time value to detect enough changes in the animation data to satisfy the threshold a second time, then the next time value for the next set of data points may be set to the 89 millisecond mark in the animation.

By setting the threshold to an individual detected change, the encoding may include generating one or more data points with time values to coincide with the timing of the detected change. By setting a larger threshold, the encoding may include delaying the changes to the rendered animation until there are enough changes to satisfy the larger threshold. For instance, changing individual data points every millisecond may be visibly indistinguishable from changing a set of data points whenever there is a large enough change to be noticed (e.g., changing 1,000 data points from 1,000,000 point cloud data points used to generated an image of the animation).

Process 500 may include determining (at 512) if the animation data includes additional data and/or changes. In response to determining (at 512—Yes) that the animation data includes additional data and/or changes, process 500 may include detecting (at 506) the changes relative to a last image that is created from the most recently generated set of data points, comparing (at 508) the changes to the threshold, and generating (at 510) a next set of data points with a next time value for each detected change in response to the number or amount of detected (at 506) changes satisfying the threshold. In response to determining (at 512—No) that the animation data does not include additional data and/or changes, process 500 may including defining (at 514) time value durations for the data points.

Defining (at 514) the time value durations may include identifying background data points that repeat with the same positional values and non-positional values at different times, and setting an infinite time value for the background data points. Defining (at 514) the time value durations may further include identifying data points that remain unchanged for some duration (e.g., more than one image or some amount of time in the animation), and modifying the time values of those data points to include a duration parameter or end time corresponding to the time those data points remain unchanged in the animation.

Process 500 may include outputting (at 516) the encoding of the animated point cloud. The animated point cloud may be a single file or a single point cloud that includes a plurality of data points with a first set of positional values and a second set of non-positional values that include a time value and/or duration parameter.

Accordingly, encoding process 500 may include monitoring an animation, detecting changes that occur at different time within the animation, and generating a point cloud with temporally-defined data points that discretely recreate each detected change in 3D space at the same time as when the changes were detected in the animation or at offset times that recreate a set of changes together so that there is some gap in the encoding or rendering of the point cloud data points.

In some embodiments, encoding process 500 may encode movement, changes, and/or animation occurring for a static render position. In some other embodiments, encoding process 500 may encode movement, changes, and/or animation occurring within an environment and/or space, and the render position may be changed and/or custom defined for each rendering pass. For instance, a user may fix a first render position at a first position in the animated point cloud, and the encoding and rendering system may render the animated point cloud from the first render position, wherein the rendering produces images of the animation encoded by the subset of point cloud data points within the field-of-view defined by the first render position. The user may then define a changing second render position that moves within the point cloud over the animation duration, and the encoding and rendering system may render the animated point cloud based on the changing second render position which may include one or more images of the animation encoded by a first subset of point cloud data points that are within the field-of-view defined for the second render position at a first time and that are defined with time values spanning the first time, followed by one or more images of the animation encoded by different subsets of point cloud data points that are within the field-of-view defined for the second render position at other times of the animation and that are defined with time values spanning those other times.

In some embodiments, the one or more render positions for an animated point cloud may be defined and/or associated with the animated point cloud prior to rendering the animated point cloud. In some other embodiments, the one or more render positions may be dynamically defined and/or changed as the animated point cloud is being rendered and the animation is being presented. In other words, the field-of-view for the animation may be dynamically changed throughout the duration or playback of the animation.

Figure 6:
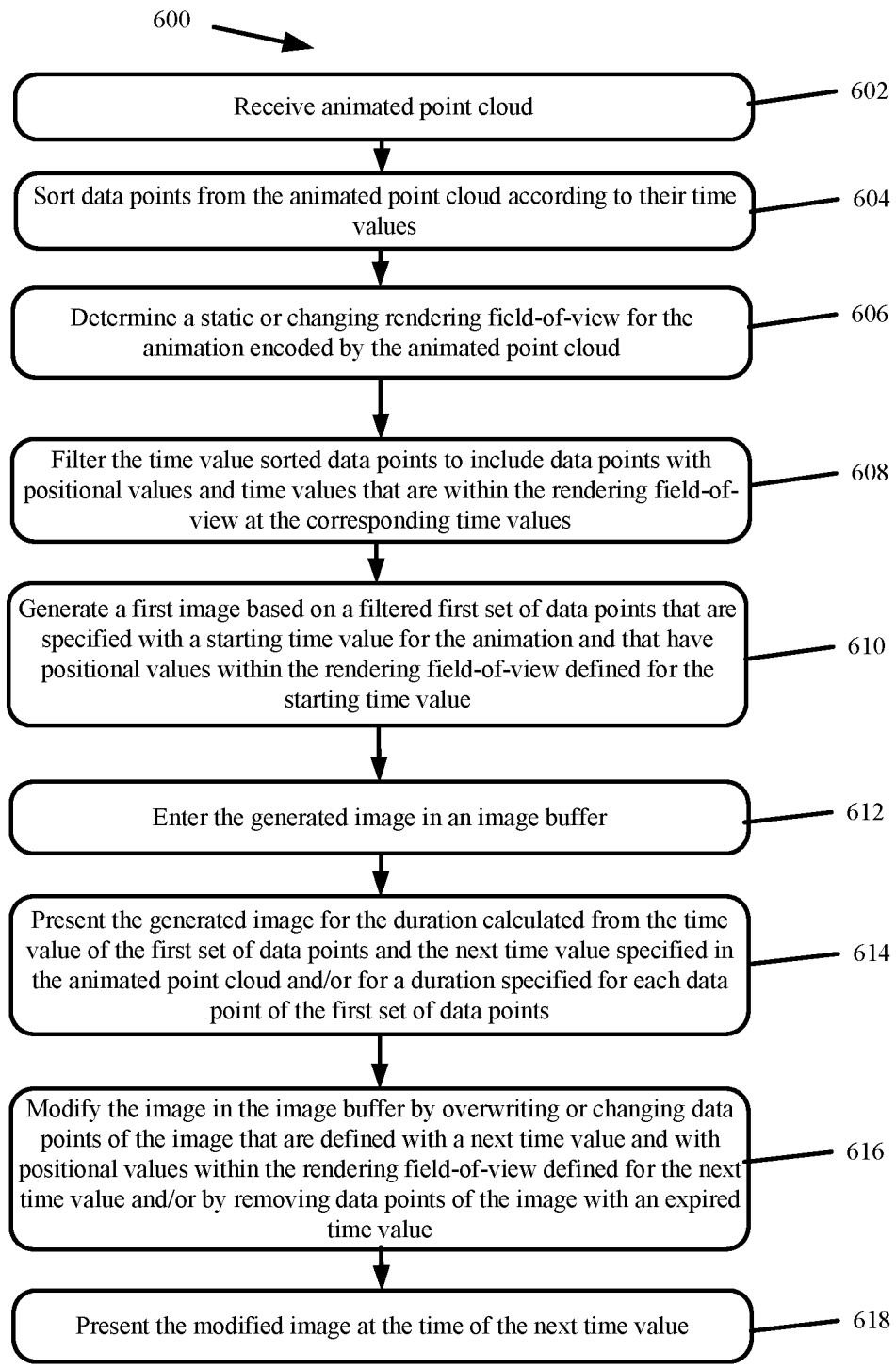
FIG. 6 presents a process for rendering an animated point cloud in accordance with some embodiments presented herein.

FIG. 6 presents a process 600 for rendering an animated point cloud in accordance with some embodiments presented herein. Process 600 may be implemented by the encoding and rendering system of some embodiments.

Process 600 may include receiving (at 602) an animated point cloud. In some embodiments, the animated point cloud may be a single file or single point cloud that is encoded with a plurality of data points with each data point of the plurality of data points having a first set of positional values and a second set of non-positional values that include a time value and/or duration parameter.

Process 600 may include sorting (at 604) the data points from the animated point cloud according to their time values. For instance, the encoding and rendering system may create arrays for each time value start time detected within the animated point cloud, and may add, to each array, the data points that have a time value start time that matches the start time of that array. Sorting (at 604) the data points may therefore include defining an order by which to process and/or render the data points.

Process 600 may include determining (at 606) a static or changing rendering field-of-view for the animation encoded by the animated point cloud. For instance, the animated point cloud may include data points for animations of different objects or scenes within a larger 3D environment, and a rendering position (e.g., a camera position) and a field-of-view for the rendering position may be defined anywhere within the 3D environment to restrict the presentation of the animations within the 3D environment to the subset of animations occurring within the rendering position field-of-view. Animations occurring outside the rendering position field-of-view may not displayed or visualization as part of the rendering output. The rendering position may include a 3D position and/or orientation within the 3D environment, and the field-of-view may specify the depth-of-field, viewing angle, and/or other properties for what portions of the 3D environment should be rendered from the rendering positions.

In some embodiments, the rendering field-of-view may be defined as a static set of positional coordinates within the 3D environment or 3D space represented by the animated point cloud. In some such embodiments, the static rendering field-of-view may correspond to a fixed volume or area of the 3D environment or the 3D space that is to be rendered for the duration of the animation. In other words, the static rendering field-of-view may present a particular subset of the animations that occur for the duration of time represented by the animated point cloud in a specific portion of the 3D space represented by a data points with different time values falling within the static set of positional coordinates defined for the static rendering field-of-view.

In some embodiments, the rendering field-of-view may be defined as a static or changing set of positional coordinates within the 3D environment or 3D space represented by the animated point cloud. In some such embodiments, the rendering field-of-view may change over time based on the rendering position, orientation, and/or field-of-view changing or moving over time. For instance, the rendering field-of-view may be defined to pan across the 3D environment represented by the animated point cloud so that animations occurring at different parts of the 3D environment are presented at different times. The rendering field-of-view may be defined manually by a user identifying specific animations or portions of the 3D environment for viewing at different times, and/or may be defined as part of animated point cloud file and/or metadata. For instance, the encoding and rendering system may generate different animations from the same animated point cloud based on different defined positions and movements of a virtual camera within the animated point cloud for each animation.

Process 600 may include filtering (at 608) the time value sorted data points based on the rendering field-of-view. Filtering (at 608) may include determining the set of positional coordinates for the rendering field-of-view at different time values, and selecting the animated point cloud data points at a particular time value that have positional values within the set of positional coordinates that are defined for the rendering field-of-view at that particular time value. The filtering (at 608) may therefore exclude, from rendering, the data points at each time value that are outside the rendering field-of-view for the corresponding time values.

Process 600 may include generating (at 610) a first image based on a filtered first set of data points that are specified with a starting time value for the animation and that have positional values within the rendering field-of-view defined for the starting time value. Generating (at 610) the first image may include creating a visualization primitive based on the positional and non-positional values of each data point in the filtered first set of data points. The visualization primitive may include a colored circle, square, pixel, voxel, or other form that may be displayed on a screen or display.

Process 600 may include entering (at 612) the generated (at 610) image in an image buffer, and presenting (at 614) the generated (at 610) image on the screen or display for the duration calculated from the time value of the first set of data points and the next time value specified in the animated point cloud and/or for a duration specified for each data point of the first set of data points. Process 600 may include modifying (at 616) the image in the image buffer by overwriting or changing data points of the image that are defined with a next time value and with positional values within the rendering field-of-view defined for the next time value and/or by removing data points of the image with an expired time value, and presenting (at 618) the modified image at the time of the next time value.

In this manner, the encoding and rendering system may continually change different parts of the image within the image buffer rather than rendering the image anew each time a different image is to be displayed. In some embodiments, the encoding and rendering system may update the image in the image buffer as a previous image is being displayed, and the encoding and rendering system may use multiple image buffers to render one or more images ahead of the image being presented. For instance, a first image may be displayed for 30 milliseconds, and it may take 15 milliseconds for the encoding and rendering system to make the changes to the first image based on data points associated with a second time value and to generate a second image that is to be displayed at the 30 millisecond mark in the animation. Rather than wait until the 30 millisecond mark before presenting the second image and beginning to modify the second image based on data points associated with a third time value, the encoding and rendering system may copy the second image into a second image buffer and may change the second image based on the data points associated with the third time value while the first image is still being presented and before the 30 millisecond mark when the second image is to be displayed. Process 600 may repeat the modifying (at 616) and presenting (at 618) of the next image until all images for the animation have been rendered.

Figure 7:
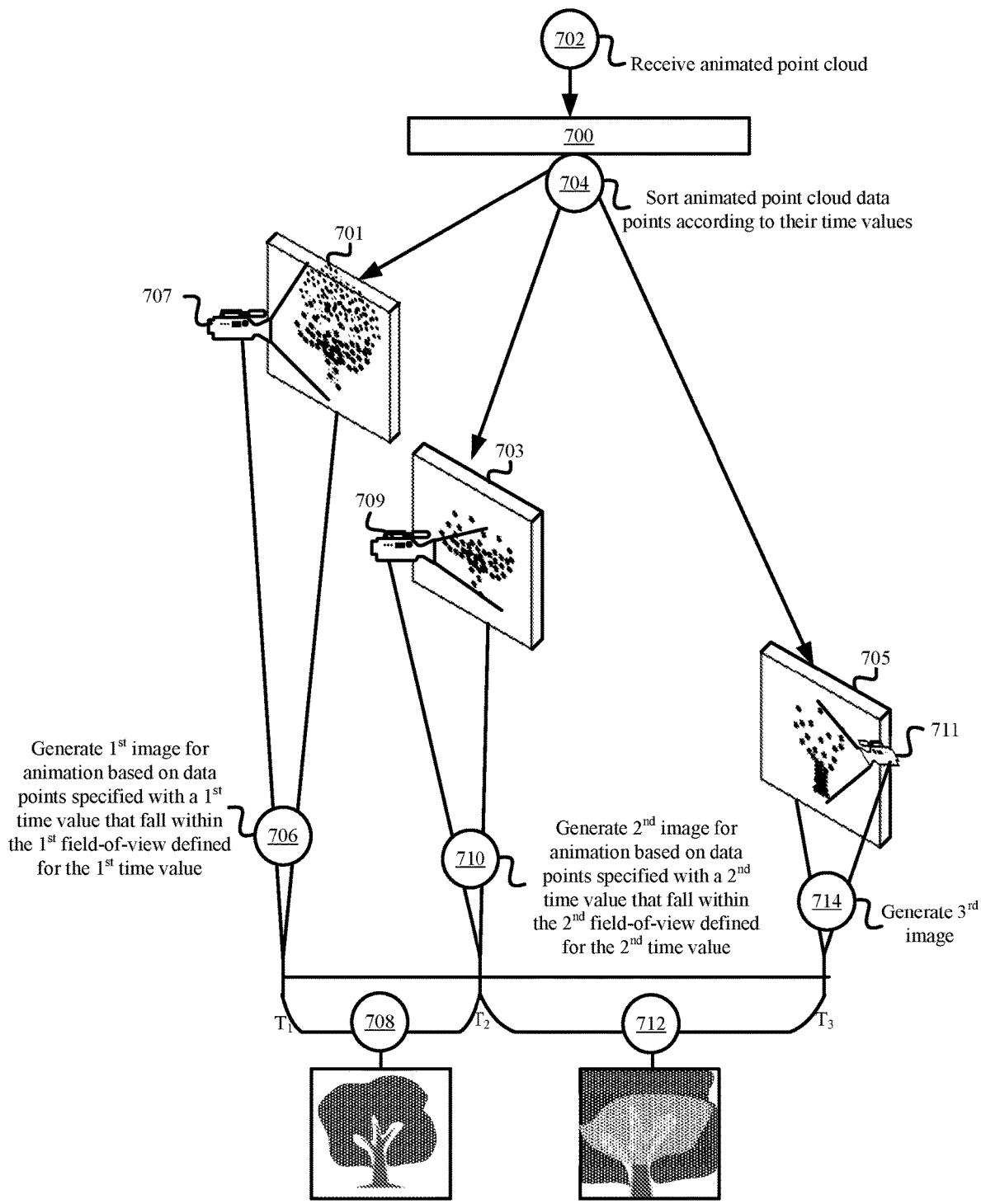
FIG. 7 illustrates an example of rendering an animated point cloud from a changing field-of-view in accordance with some embodiments presented herein.

FIG. 7 illustrates an example of rendering an animated point cloud from a changing field-of-view in accordance with some embodiments presented herein. Encoding and rendering system 700 may receive (at 702) the animated point cloud, and may sort the point cloud data points according to their time values to identify (at 704) a first set of data points 701 that are defined with a first time value and with different durations, a second set of data points 703 that are defined with a second time value and different durations, and a third set of data points 705 that are defined with a third time value and durations. In some embodiments, the gap between the first time value and the second time value may be different than the gap between the second time value and the third time value. For instance, the gap between the first time value and the second time value may be 100 milliseconds and the gap between the second time value and the third time value may be 150 milliseconds. Accordingly, the image generated from the first set of data points 701 may be rendered for 100 milliseconds, and the image generated from the second set of data points 703 may be rendered for 150 milliseconds.

Encoding and rendering system 700 may determine that a first rendering field-of-view 707 is defined for the first time value, and that the first rendering field-of-view encompasses each data point of the first set of data points 701. Accordingly, encoding and rendering system 700 may generate (at 706) a first image for the animation by rendering each data point of the first set of data points 701 from the first rendering field-of-view 707.

Encoding and rendering system 700 may present (at 708) the first image for the duration between the first time value and the second time value. While presenting (at 708) the first image, encoding and rendering system 700 may begin to render the next image for the animation. To do so, encoding and rendering system 700 may determine that a different second rendering field-of-view 709 is defined for the second time value. Encoding and rendering system 700 may determine that a subset of the previously rendered first set of data points 701 are specified with a duration that extends to the second time value and are defined with positional values that fall within the second rendering field-of-view 709. Additionally, encoding and rendering system 700 may determine that a subset of the second set of data points 703 are defined with positional values that fall within the second rendering field-of-view 709. Accordingly, encoding and rendering system 700 may generate (at 710) the second image for the animation by rendering the subset of the first set of data points 701 and the subset of the second set of data points 703 from the second field-of-view 709. In some embodiments, generating (at 710) the second image may include manipulating the first image for visualization from the second field-of-view 709, and/or replacing or overwriting rendered data points of the first set of data points 701 with data points of the second set of data points 703 that are specified with the same positional values. In other words, encoding and rendering system 700 may update parts of the first image that are defined by the second set of data points 703, and may render the updated image from the second field-of-view 709.

Encoding and rendering system 700 may present (at 712) the second image for the duration between the second time value and the third time value. As noted above, the gap between the first time value and the second time value may be different than the gap between the second time value and the third time value. For instance, the gap between the first time value and the second time value may be 100 milliseconds and the gap between the second time value and the third time value may be 150 milliseconds. Accordingly, encoding and rendering system 700 may present (at 708) the first image for 100 milliseconds, and may present (at 712) the second image for 150 milliseconds after having presented (at 708) the first image.

Encoding and rendering system 700 may generate (at 714) a third image of the animation by replacing data points of the second image based on positional value and non-positional values defined for the third set of data points 705, and by rendering the modified second image from the third field-of-view 711 defined for the third time value. Encoding and rendering system 700 may continue updating data points of a previously rendered image based on data points defined with a next value, and may render each updated image at the defined time value until the animation is complete.

In some embodiments, the rendering process may be optimized to reduce the overhead associated with individually rendering a large number of data points for an image at a specific time value. The optimization may include preprocessing the sorted data points that are within the rendering field-of-view for one or more time values, and replacing a set of neighboring data points with the same or similar non-positional values with a single primitive that spans the area or volume represented by the set of neighboring data points and that has the same or similar non-positional values as the set of neighboring data points. In other words, the encoding and rendering system may replace two or more data points that are separately rendered at a particular time value in the animation with a single primitive that can be rendered in a single rendering pass and that produces the same visualization as the two or more data points that were replaced by the primitive.

Figure 8:
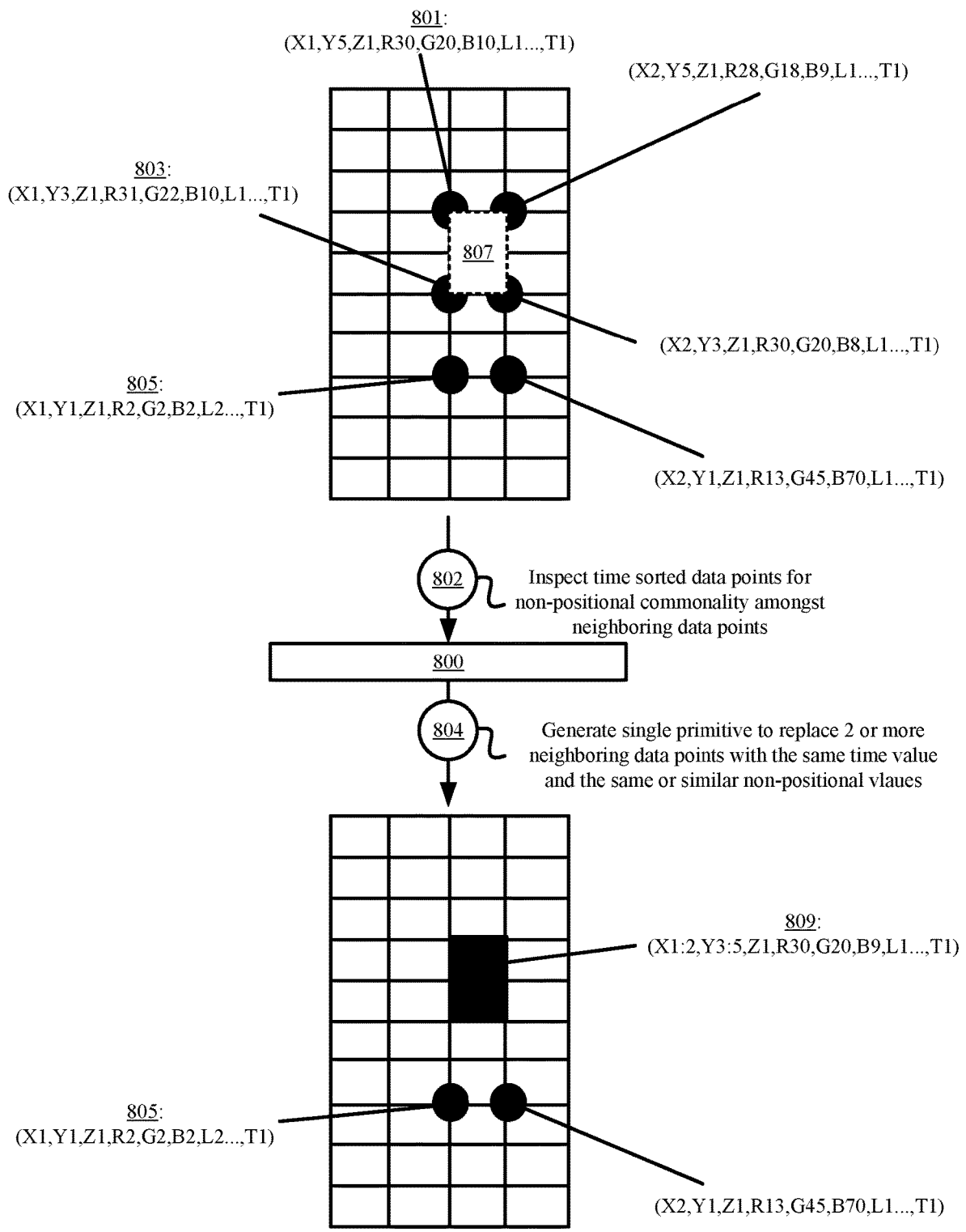
FIG. 8 illustrates an example of optimizing animated point cloud rendering in accordance with some embodiments presented herein.

FIG. 8 illustrates an example of optimizing animated point cloud rendering in accordance with some embodiments presented herein. FIG. 8 illustrates a set of data points with a particular time value and positional values that are within the rendering field-of-view defined for that particular time value. In other words, the set of data points may represent the data points from which an image of the animation for the particular time value is to be generated.

Encoding and rendering system 800 may inspect (at 802) the positional values and the non-positional values of the set of data points to identify neighboring data points (e.g., a pair of data points that are directly adjacent to one another without another data point in between the pair of data points) that have the same or similar non-positional data values. Similar non-positional data value may include non-positional values that have less than a threshold amount of variance between them. For instance, first data point 801 may have a red color component of 30, and neighboring second data point 803 may have a red color component of 31. Although the red color components of first data point 801 and second data point 803 are different, encoding and rendering system 800 may identify the red color components as being similar based on similarity threshold allowing for up to a 5% variation in the color components of neighboring data points 801 and 803. However, encoding and rendering system 800 may determine that the difference in the red color component of second data point 803 and neighboring third data point 805 is greater than 5%, and that these neighboring data points do not have non-positional value commonality and/or similarity.

In response to identifying subset of the set of data points 807 that neighbor one another and that have the same or similar non-positional data values, encoding and rendering system 800 may define (at 804) primitive 809 that approximates or is of the shape of the subset of data points 807 and/or that spans the area or volume of the subset of data points 807 and that has non-positional values that match or is a closest approximation to the non-positional data values of the subset of data points 807. Primitive 809 may include a mesh, polygon, and/or another regular or irregular form. The non-positional values of primitive 809 may be derived by calculating the averaging or mean value for each non-positional value of the subset of data points 807. Encoding and rendering system 800 may replace (at 804) the subset of data points 807 with the defined primitive 809 in the animated point cloud at the corresponding time value. Accordingly, when generating the visualization for the particular time value of the animation, encoding and rendering system 800 may render the single primitive 809 instead of each data point of the subset of data points 807.

Figure 9:
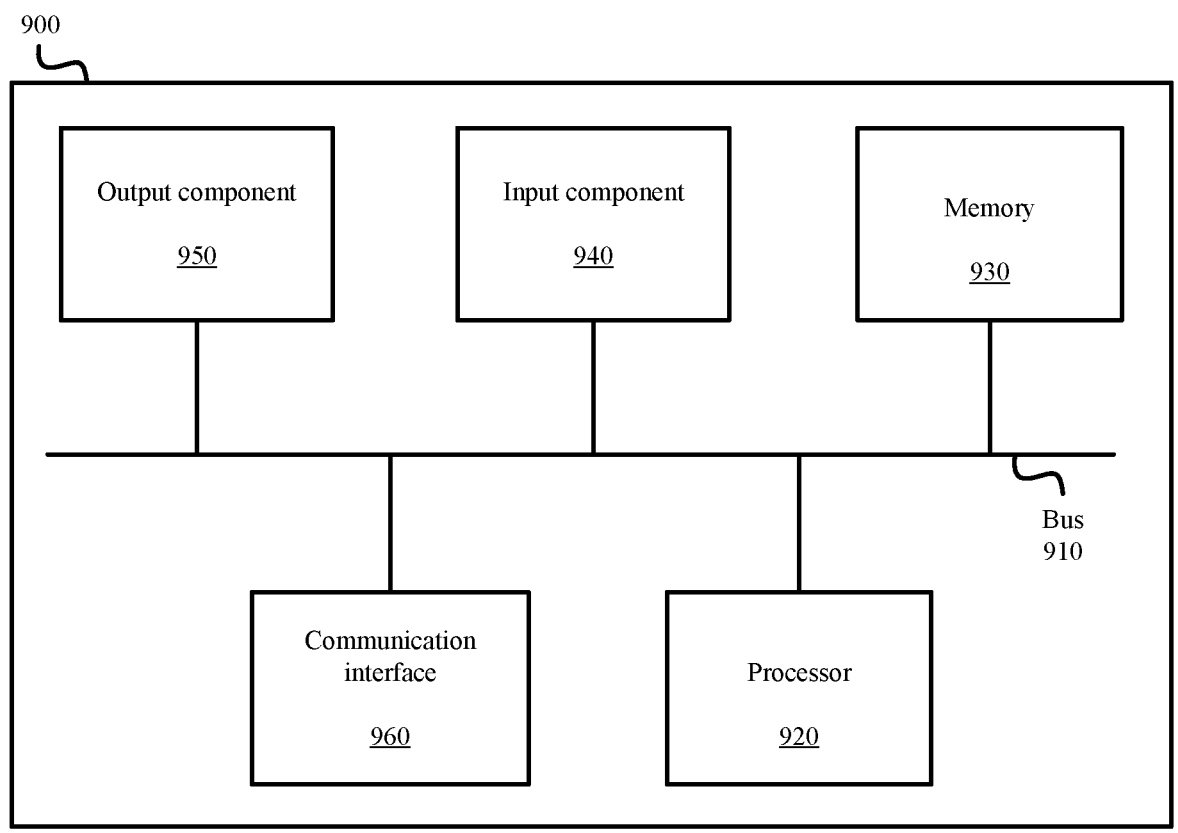
FIG. 9 illustrates example components of one or more devices, according to one or more embodiments described herein.

FIG. 9 is a diagram of example components of device 900. Device 900 may be used to implement one or more of the devices or systems described above (e.g., the encoding and/or rendering system, the encoder, the renderer, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a point cloud comprising (i) a first set of data points that are defined with different positional values, different non-positional values, and a first time value, and (ii) a second set of data points that are defined with different positional values, different non-positional values, and a second time value;
   generating a first image of an animation at the first time value based on the positional values and the non-positional values of the first set of data points, wherein generating the first image comprises:
      generating a first visualization at a first position in the first image corresponding to the positional values of a first data point from the first set of data points and with coloring derived from the non-positional values of the first data point; and
      generating a second visualization at a second position in the first image corresponding to the positional values of a second data point from the first set of data points and with coloring derived from the non-positional values of the second data point;
   presenting the first image at the first time value and for a duration equal to a difference between the second time value and the first time value;
   modifying at least one discrete point of the first image based on the second set of data points defined with the second time value, wherein modifying the at least one discrete point comprises:
      changing the first visualization created at the first position in the first image to a different third visualization based on the positional values of a particular data point from the second set of data points matching the positional values of the first data point and the non-positional values of the particular data point differing from the non-positional values of the first data point; and
      retaining the second visualization created at the second position in the first image in response to the positional values of each data point of the second set of data points differing from the positional values defined for the second data point; and
   presenting a second image of the animation at the second time value based on a modified first image with the third visualization at the first position and the second visualization at the second position.

2. The method of claim 1,
   wherein generating the first image further comprises:
      generating a fourth visualization at a third position in the first image based on the positional values of a third data point from the first set of data points that is defined with the first time value; and
      deriving coloring for the fourth visualization from the non-positional values of the third data point; and wherein modifying the at least one discrete point further comprises removing the third visualization from the second image presented at the second time value in response to the second set of data points comprising the third data point with the second time value and with a zero or negative value for the non-positional values.

3. The method of claim 1,
wherein generating the first image further comprises:
generating a fourth visualization at a third position in the first image based on the positional values of a third data point from the first set of data points that is defined with the first time value; and
deriving coloring for the fourth visualization from the non-positional values of the third data point; and
wherein modifying the at least one discrete point further comprises removing the fourth visualization from the second image presented at the second time value in response to the first time value of the third data point being defined with a duration that ends before the second time value.

4. The method of claim 1,
wherein retaining the second visualization comprises preserving the second visualization in the second image as a result of the first time value of the second data point comprising a first time that corresponds to the first time value and a duration that extends past the second time value.

5. The method of claim 1,
wherein the point cloud further comprises a third set of data points that are defined with different positional values, different non-positional values, and a third time value; and
wherein presenting the second image comprises presenting the second image for a different duration than the first image in response to a difference between the third time value and the second time value being different than a difference between the second time value and the first time value.

6. The method of claim 1 further comprising:
detecting changes occurring within the animation over a period of time; and
encoding the first set of data points with the first time value in response to detecting a first set of changes occurring at a first time in the animation that corresponds to the first time value.

7. The method of claim 6 further comprising:
encoding the second set of data points with the second time value in response to detecting no changes in the animation after the first time until a second time in the animation that corresponds to the second time value, and detecting a second set of changes occurring at the second time in the animation.

8. The method of claim 6 further comprising:
tracking a second set of changes that occur in the animation after the first time until a second time in the animation;
encoding the second set of data points with the second time value in response to an amount of changes tracked as part of the second set of changes satisfying a threshold at the second time.

9. The method of claim 1 further comprising:
increasing a resolution of the second image relative to the first image in response to the positional values of the second set of data points adding visualizations in between visualizations created from the positional values of the first set of data points; and
wherein presenting the second image comprises outputting the animation with the first image at a first resolution for a first duration and with the second image at a different second resolution for a second duration after the first duration.

10. The method of claim 1 further comprising:
sorting the first set of data points and the second set of data points of the point cloud according to the first time value and the second time value; and
wherein rendering the first image comprises accessing the first set of data points from the point cloud without accessing the second set of data points as a result of said sorting.

11. The method of claim 1 further comprising:
determining a rendering field-of-view defined for the first time value;
filtering a first subset of data points from the first set of data points, wherein filtering the first subset of data points comprises identifying data points from the first set of data points with the positional values falling within the rendering field-of-view, and wherein the first data point and the second data point are data points within the first subset of data points; and
wherein generating the first image further comprises generating visualizations at positions corresponding to the positional values of the first subset of data points within the rendering field-of-view, and omitting, from a rendering of the first image, other data points of the first set of data points outside the rendering field-of-view.

12. The method of claim 1 further comprising:
recording a three-dimensional ("3D") environment over a period of time; and
encoding the point cloud with a plurality of data points, wherein said encoding comprises defining the first data point of the first set of data points and the particular data point of the second set of data points for a common position within the 3D environment and with different non-positional values based on different properties recorded for the common position at the first time value and the second time value.

13. The method of claim 1,
wherein the positional values for the first set of data points and the second set of data points comprise x, y, and z coordinate values corresponding to different positions in 3D space; and
wherein the non-positional values for the first data point comprise first color components of a particular point in 3D space at the first time value, and the non-positional values for the particular data point comprise different second color components of the particular point in 3D space at the second time value.

14. A system comprising:
one or more processors configured to:
receive a point cloud comprising (i) a first set of data points that are defined with different positional values, different non-positional values, and a first time value, and (ii) a second set of data points that are defined with different positional values, different non-positional values, and a second time value;
generate a first image of an animation at the first time value based on the positional values and the non-positional values of the first set of data points, wherein generating the first image comprises:
generating a first visualization at a first position in the first image corresponding to the positional values of a first data point from the first set of data points and with coloring derived from the non-positional values of the first data point; and generating a second visualization at a second position in the first image corresponding to the positional values of a second data point from the first set of data points and with coloring derived from the non-positional values of the second data point;

present the first image at the first time value and for a duration equal to a difference between the second time value and the first time value;

modify at least one discrete point of the first image based on the second set of data points defined with the second time value, wherein modifying the at least one discrete point comprises:

changing the first visualization created at the first position in the first image to a different third visualization based on the positional values of a particular data point from the second set of data points matching the positional values of the first data point and the non-positional values of the particular data point differing from the non-positional values of the first data point; and retaining the second visualization created at the second position in the first image in response to the positional values of each data point of the second set of data points differing from the positional values defined for the second data point; and present a second image of the animation at the second time value based on a modified first image with the third visualization at the first position and the second visualization at the second position.

15. The system of claim 14,
wherein generating the first image further comprises:
generating a fourth visualization at a third position in the first image based on the positional values of a third data point from the first set of data points that is defined with the first time value; and
deriving coloring for the fourth visualization from the non-positional values of the third data point; and
wherein modifying the at least one discrete point further comprises removing the fourth visualization from the second image presented at the second time value in response to the second set of data points comprising the third data point with the second time value and with a zero or negative value for the non-positional values.

16. The system of claim 14,
wherein generating the first image further comprises:
generating a fourth visualization at a third position in the first image based on the positional values of a third data point from the first set of data points that is defined with the first time value; and
deriving coloring for the fourth visualization from the non-positional values of the third data point; and
wherein modifying the at least one discrete point further comprises removing the fourth visualization from the second image presented at the second time value in response to the first time value of the third data point being defined with a duration that ends before the second time value.

17. The system of claim 14, wherein the one or more processors are further configured to:
detect changes occurring within the animation over a period of time; and
encode the first set of data points with the first time value in response to detecting a first set of changes occurring at a first time in the animation that corresponds to the first time value.

18. The system of claim 17, wherein the one or more processors are further configured to:
encode the second set of data points with the second time value in response to detecting no changes in the animation after the first time until a second time in the animation that corresponds to the second time value, and detecting a second set of changes occurring at the second time in the animation.

19. The system of claim 17, wherein the one or more processors are further configured to:
track a second set of changes that occur in the animation after the first time until a second time in the animation;
encode the second set of data points with the second time value in response to an amount of changes tracked as part of the second set of changes satisfying a threshold at the second time.

20. A non-transitory computer-readable medium, storing a plurality of processor-executable instructions to:
receive a point cloud comprising (i) a first set of data points that are defined with different positional values, different non-positional values, and a first time value, and (ii) a second set of data points that are defined with different positional values, different non-positional values, and a second time value;

generate a first image of an animation at the first time value based on the positional values and the non-positional values of the first set of data points, wherein generating the first image comprises:

generating a first visualization at a first position in the first image corresponding to the positional values of a first data point from the first set of data points and with coloring derived from the non-positional values of the first data point; and generating a second visualization at a second position in the first image corresponding to the positional values of a second data point from the first set of data points and with coloring derived from the non-positional values of the second data point;

present the first image at the first time value and for a duration equal to a difference between the second time value and the first time value;

modify at least one discrete point of the first image based on the second set of data points defined with the second time value, wherein modifying the at least one discrete point comprises:

changing the first visualization created at the first position in the first image to a different third visualization based on the positional values of a particular data point from the second set of data points matching the positional values of the first data point and the non-positional values of the particular data point differing from the non-positional values of the first data point; and retaining the second visualization created at the second position in the first image in response to the positional values of each data point of the second set of data points differing from the positional values defined for the second data point; and present a second image of the animation at the second time value based on a modified first image with the third visualization at the first position and the second visualization at the second position.

* * * * *